United States Patent
Gordon

[15] 3,670,245
[45] June 13, 1972

[54] LOGIC CLIP
[72] Inventor: Gary B. Gordon, Cupertino, Calif.
[73] Assignee: Hewlett-Packard Company, Palo Alto, Calif.
[22] Filed: March 5, 1970
[21] Appl. No.: 16,757

[52] U.S. Cl. ............................................. 324/73 R, 324/51
[51] Int. Cl. ................................. G01r 15/12, G01r 31/02
[58] Field of Search ........... 324/73 R, 103 P, 51, 127, 20–27, 324/140 R; 307/256, 259; 340/248 R, 248 B, 248 C

[56] References Cited

UNITED STATES PATENTS

| | | |
|---|---|---|
| 3,092,732 | 6/1963 | Milford.............................324/103 P |
| 2,724,821 | 11/1955 | Schweitzer, Jr...................324/127 X |
| 3,076,901 | 2/1963 | Rubin et al.........................324/133 X |
| 3,281,692 | 10/1966 | Beroset..............................324/133 X |
| 3,304,498 | 2/1967 | Myers.................................324/133 |

Primary Examiner—Rudolph V. Rolinec
Assistant Examiner—Ernest F. Karlsen
Attorney—A. C. Smith

[57] ABSTRACT

A device which clips onto dual in-line integrated circuit (referred to herein as I.C.) package has a visual indicator for each pin or lead on the I.C. package to indicate the logic state on each pin or lead, and the device determines which leads are connected to the power supply and ground and uses the voltage across those leads to power itself.

7 Claims, 3 Drawing Figures

INVENTOR.
GARY B. GORDON

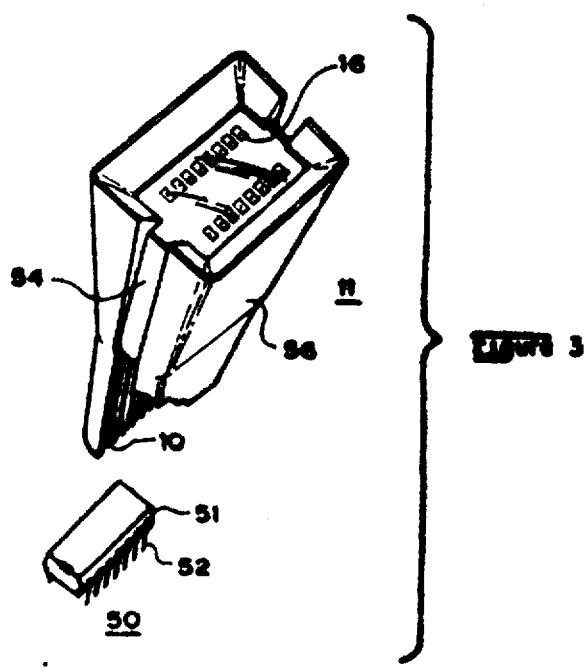

LOGIC CLIP

BACKGROUND OF THE INVENTION

When designing and servicing equipment with I.C. logic modules, it is necessary for the engineer or technician to know the logic states at various points in the equipment. Since these logic states are represented by discrete voltage levels which are present on the input and output leads of the I.C.'s, the usual method of determining the states has been to use an oscilloscope or a voltmeter to measure the voltage on each lead. This method is slow and cumbersome, since only one or two leads at a time can be tested, and the operator must divert his attention away from the circuit under test to read the instrument. Also, since most logic circuits are binary in nature, the precise voltage is not important to the operator, he desires to know only whether the voltage is above or below some given threshold value. Recently a probe has been made available which has a light in it which is on when the voltage is above the threshold and off when it is below. The probe overcomes some of the limitations of a voltmeter or oscilloscope, but one must still measure the voltage on the I.C. leads one by one, which is a slow process when there are many leads. In addition, each of the aforementioned instruments requires power from some external source.

SUMMARY OF THE INVENTION

The device of the present invention indicates the logic state on each lead or pin of an I.C. simultaneously. The logic clip fastens to an I.C. and has 16 visual indicators which are connected to logic gates in the logic clip. A visual indicator is lit or on when the logic state on the lead or pin it represents is high or is an open circuit and is off otherwise. The visual indicators are arranged in a pattern which bears a one-to-one correspondence with the physical arrangement of the leads on the I.C. package. The present device does not require an external power supply or external power leads to connect to a power source and does not require a battery. Accordingly, the logic clip of the present invention incorporates a circuit which determines the power and ground leads on the I.C. under test and uses some of the power on those leads to power itself.

DESCRIPTION OF THE DRAWINGS

FIG. 3 shows the physical configuration of the preferred embodiment and a dual in-line integrated circuit package.

DESCRIPTION OF THE PREFERRED EMBODIMENT

Figure 1:
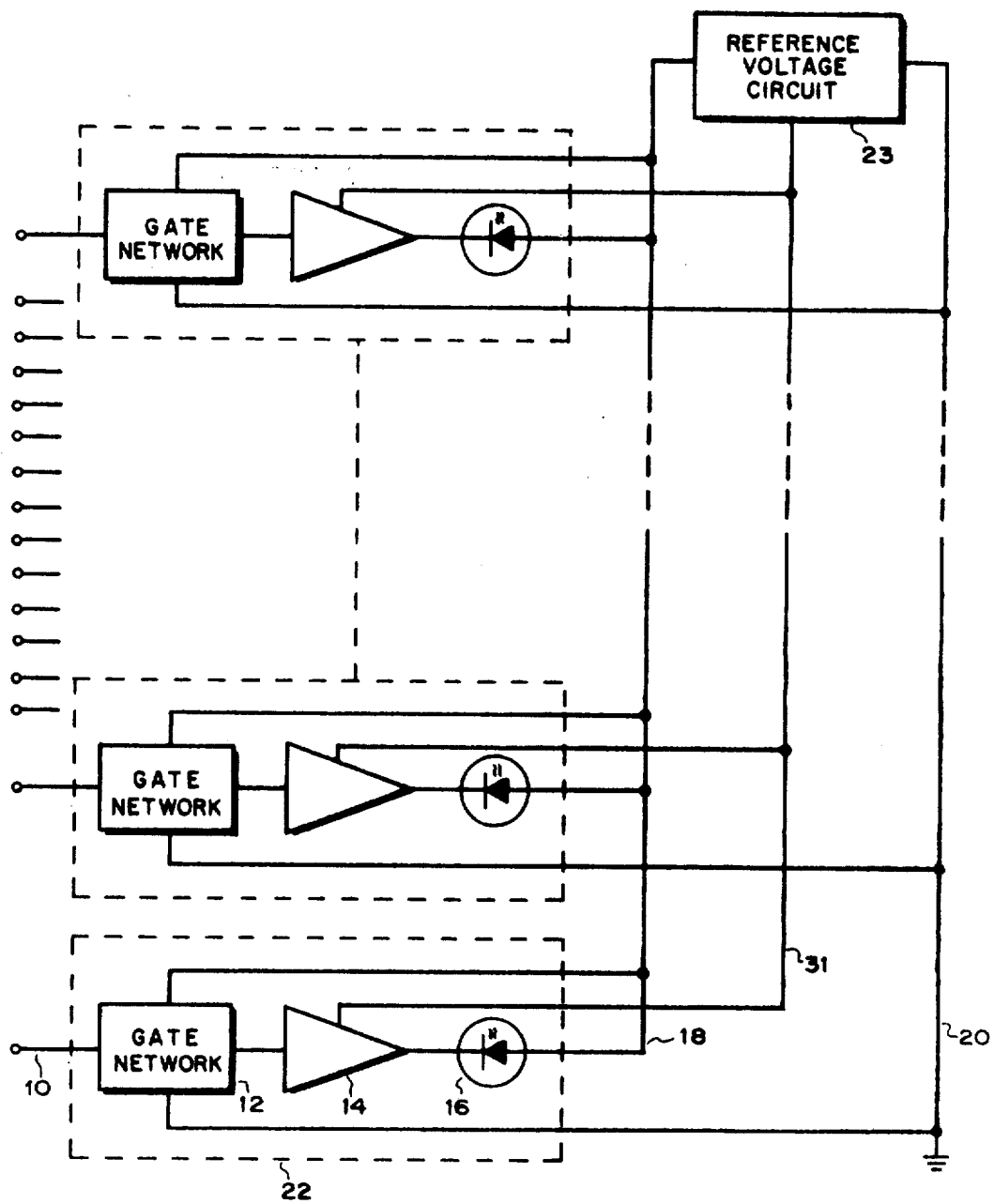
FIG. 1 shows a simplified schematic block diagram of the preferred embodiment.

Referring to FIG. 1, there are 16 inputs 10, each of which is connected to a decision gate network 12 and a threshold detector/amplifier 14. The detector/amplifier 14 drives the light-emitting diode (LED) 16. Elements 10, 12, 14 and 16 comprise one logic state detector 22. The logic clip is comprised of sixteen logic state detectors 22 which share common positive supply voltage bus 18 and ground bus 20. The decision gate network 12 decides whether the input 10 is connected to a ground, a supply or a logic lead on the I.C. If input 10 is connected to a supply lead, the decision gate network connects input 10 to supply bus 18, and all other logic state detectors 22 receive supply voltage from the supply bus 18 through that input 10. If input 10 is connected to ground, the decision gate network connects input 10 to ground bus 20, and all other logic state detectors 22 are connected to ground through ground bus 20 to that input 10. If input 10 is connected to a logic lead detector/amplifier 14 determines whether the input voltage is above or below the threshold value 1.4 volt, and turns on LED 16 if the input is an open circuit or is above 1.4 volt. Each logic clip also includes a reference voltage circuit 23 which is connected to supply bus 18 and ground bus 20. The reference voltage circuit 23 supplies 2.1 volts to each detector/amplifier 14 through reference bus 31.

Figure 2:
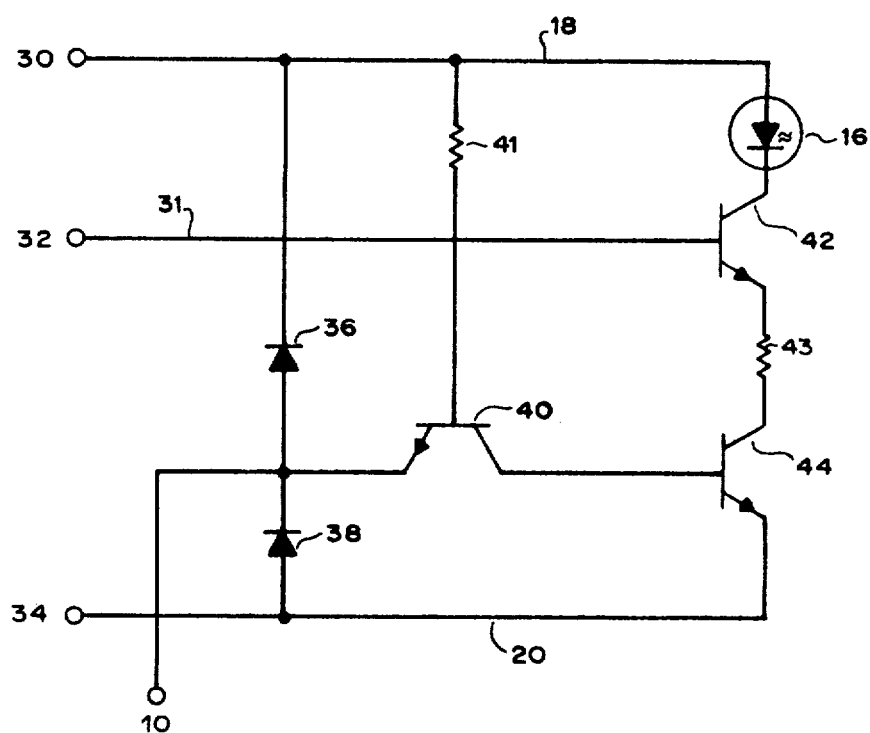
FIG. 2 shows a schematic diagram of one of the logic state detectors used in the preferred embodiment.

FIG. 2 shows a schematic diagram of one logic state detector 22. Diode 36 connected between input 10 and supply bus 18 and diode 38 connected between input 10 and ground bus 20 comprise the decision gate network 12. Whichever input 10 is highest in voltage will forward bias diode 36 and will therefore be connected to supply bus 18. Whichever input 10 is lowest in voltage will forward bias diode 38 and will therefore be connected to ground bus 20. Any input 10 with a logic level on it will be a few tenths of a volt higher than ground and lower than the supply voltage due to the way I.C. logic circuits are designed, and therefore both diodes 36 and 38 will not be biased to conduction. Each logic state detector 22 is connected to each other and the reference voltage circuit at point 30 for supply voltage, at point 32 for the reference voltage, and at point 34 for ground. Transistor 40 operates as the threshold detector, with its emitter connected to input 10, its base connected to the supply bus 18 through a bias resistor 41, and its collector connected to the base of transistor 44. Transistors 42 and 44 form the LED 16 driver amplifier. LED 16 is connected between the supply bus 18 and the collector of transistor 42 so that LED 16 will turn on when transistor 42 is on or conducting. The base of transistor 42 is connected to reference bus 31 and therefore is always at the reference voltage 2.1 volts. The emitter or transistor 42 is connected to the collector of transistor 44 through a bias resistor 43 and the emitter of transistor 44 is connected to ground bus 20.

If input 10 is an open circuit, current will flow from the supply bus 18 through the base-collector junction of transistor 40 and into the base of transistor 44, which will allow transistor 44 to conduct. When transistor 44 conducts, transistor 42 conducts and LED 16 turns on. This effect is consistent with the operation of many types of I.C. circuits in which an open circuited lead is considered to be in the high logic state. If the voltage on input 10 is higher than the threshold value 1.4 volts current will still flow through the base-collector junction of transistor 40 since its collector is at 1.4 volts. Since the active devices in the preferred embodiment are all silicon semiconductor devices, there is a voltage drop across each diode junction of 0.7 volts when the diode is forward biased. Therefore, ground bus 20 will be 0.7 volts higher than the ground lead on the I.C. under test and the base of transistor 44 will be at 1.4 volts with respect to ground. If the voltage on input 10 is lower than 1.4 volts, current will flow through the base-emitter junction of transistor 40 and turn it on, thus removing the base bias current from transistor 44, which will turn it off and turn off LED 16. This effect corresponds to a low logic state. The reference voltage applied to the base of transistor 42 is to stabilize the current through the LED 16.

FIG. 3 shows the physical configuration of the logic clip 11, with inputs 10 and light emitting diodes 16. The circuitry diagrammed in FIG. 1 is in the body of the device 54 along with light emitting diodes 16. Dual in-line integrated circuit 50 is shown having leads 52 emerging in a regularly spaced linear array from opposite sides 51. The logic clip 11 fits over the integrated circuit 50 such that each input 10 contacts one lead 52. Squeezing sides 56 together near the top of the logic clip 11 spreads apart the two rows of input leads 10 so the logic clip 10 can be attached or removed from integrated circuit 50; and a spring mechanism in logic clip 11 keeps the input leads 10 in contact with the integrated circuit leads 52 when no pressure is applied to sides 56.

I claim:

1. A signalling apparatus comprising:
   a plurality of inputs;
   a reference signal bus;
   gating means connected to each input and to the reference signal bus for connecting an input having a potential extremum applied thereto to the reference signal bus to support current flow between the reference signal bus and the input to which the potential extremum is applied, the gating means comprising a plurality of diodes, each diode having a cathode electrode connected to a different input and an anode electrode connected to the reference signal bus; and indicating means connected to each input and to the reference signal bus for indicating the signal level on each input with respect to the signal level on the reference signal bus, the indicating means including
a plurality of optical signalling devices;
first circuit means for connecting each optical signalling device to a different input; and
second circuit means for connecting each optical signalling device to the reference signal bus;
each optical signalling device giving an optical signal in response to the signal level on the corresponding input exceeding a predetermined threshold value.

2. A signalling apparatus comprising:
a supply bus;
a plurality of inputs;
a reference signal bus;
gating means connected to each input and to the reference signal bus for connecting an input having a lower potential extremum applied thereto to the reference signal bus to support current flow between the reference signal bus and the input to which the lower potential extremum is applied, and connected to the supply bus for connecting an input having a higher potential extremum applied thereto to the supply bus to support current flow between the supply bus and the input to which the higher potential extremum is applied; and
indicating means connected to each input and to the reference signal bus for indicating the signal level on each input with respect to the signal level on the reference signal bus, the supply bus being connected to the indicating means for supplying current to the indicating means.

3. A signalling apparatus as in claim 2 wherein:
the gating means comprises a first and second plurality of diodes, each of the first plurality of diodes having a cathode electrode connected to a different input and an anode electrode connected to the reference signal bus and each of the second plurality of diodes having an anode electrode connected to a different input and a cathode electrode connected to the supply bus.

4. A signalling apparatus as in claim 3 wherein the indicating means comprises:
a threshold detector for each input, comprising an amplifier having an input connected to one of the plurality of inputs, and having an output which acts as a current source when its input is above a predetermined potential and acts as a current sink when its input is below a predetermined potential;
a driver amplifier for each input comprising an amplifier having an input connected to the threshold detector output, and having an output which acts as a current sink when current flows into its input and acts as an open circuit when no current flows into its input;
a light emitting device for each input, each device being connected to the supply bus and the output of a driver amplifier for emitting light when the driver amplifier output acts as a current sink and for emitting no light otherwise.

5. A signalling apparatus as in claim 4 wherein:
the inputs are physically disposed to electrically and mechanically connect to the corresponding conductors of an integrated circuit package; and
the light emitting devices are physically arranged in a pattern which bears a direct relationship to the physical arrangement of the leads of the integrated circuit.

6. A signalling apparatus as in claim 5 wherein the output of the threshold detector acts as a current source when its input is open circuited.

7. A signalling apparatus as in claim 6 wherein the light emitting devices are light emitting diodes.

* * * * *